United States Patent [19]

Wagner et al.

[11] Patent Number: 5,589,539
[45] Date of Patent: Dec. 31, 1996

[54] PROCESS FOR PREPARING AN IN SITU POLYETHYLENE BLEND

[75] Inventors: Burkhard E. Wagner, Highland Park; Arakalgud V. Ramamurthy, East Windsor, both of N.J.

[73] Assignee: Union Carbide Chemicals & Plastics Technology Corporation, Danbury, Conn.

[21] Appl. No.: 343,849

[22] Filed: Nov. 23, 1994

[51] Int. Cl.⁶ .............................. C08L 23/16; C08L 23/08; C08F 297/08
[52] U.S. Cl. .......................... 525/53; 525/240; 525/247; 525/268; 525/270; 525/324; 526/65
[58] Field of Search ........................ 525/53, 240, 247, 525/268, 270, 324; 526/65, 125

[56] References Cited

U.S. PATENT DOCUMENTS

| | | | |
|---|---|---|---|
| 5,047,468 | 9/1991 | Lee et al. | 525/53 |
| 5,126,398 | 6/1992 | Lee et al. | 525/53 |
| 5,149,738 | 9/1992 | Lee et al. | 525/53 |
| 5,260,384 | 11/1993 | Morimoto et al. | 525/53 X |
| 5,284,613 | 2/1994 | Ali et al. | 264/566 |
| 5,387,749 | 2/1995 | Goroni et al. | 525/53 |
| 5,405,901 | 4/1995 | Daniell et al. | 525/53 |
| 5,494,871 | 2/1996 | Brun et al. | 502/108 |

FOREIGN PATENT DOCUMENTS

| | | |
|---|---|---|
| 43220 | 1/1982 | European Pat. Off. . |
| 503791 | 9/1992 | European Pat. Off. . |

*Primary Examiner*—Judy M. Reddick
*Attorney, Agent, or Firm*—Saul R. Bresch

[57] ABSTRACT

A process for the production of an in situ particulate polyethylene blend comprising contacting a magnesium/titanium based catalyst system including a particulate precursor with one or more alpha-olefins in each of two or more reactors connected in series, in the gas phase, under polymerization conditions, with the provisos that:

(a) the particulate precursor has a particle size distribution span of no greater than about 1.5 as introduced into the first reactor in the series;

(b) ethylene is introduced into each reactor;

(c) optionally, an alpha-olefin having at least 3 carbon atoms is introduced into at least one reactor;

(d) the mixture of ethylene polymer matrix and active catalyst formed in the first reactor in the series is transferred to the subsequent reactors in the series; and (e) the polymerization conditions in each reactor are such that a high molecular weight polymer is formed in at least one reactor and a low molecular weight polymer is formed in at least one other reactor wherein the ratio of molecular weights of the high molecular weight polymer to low molecular weight polymer in the final product is at least about 8:1.

9 Claims, No Drawings

PROCESS FOR PREPARING AN IN SITU POLYETHYLENE BLEND

TECHNICAL FIELD

This invention relates to a process for preparing an in situ polyethylene blend, which can be converted into film having a small number or essentially no gels (or fish-eyes).

BACKGROUND INFORMATION

Polyethylenes of various densities have been prepared and converted into film characterized by excellent tensile strength, high ultimate elongation, good impact strength, and excellent puncture resistance. These properties together with toughness are enhanced when the polyethylene is of high molecular weight. However, as the molecular weight of the polyethylene increases, the processability of the resin usually decreases. By providing a blend of polymers of high molecular weight and low molecular weight, the properties characteristic of high molecular weight resins can be retained and processability, particularly extrudability (a characteristic of the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a high molecular weight ethylene copolymer is prepared in one reactor and a low molecular weight ethylene copolymer is prepared in another reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) one or more aluminum containing activator compounds; and (iii) a hydrocarbyl aluminum cocatalyst, the polymerization conditions being such that an ethylene copolymer having a melt index in the range of about 0.1 to about 1000 grams per 10 minutes is formed in the high melt index (low molecular weight) reactor and an ethylene copolymer having a melt index in the range of about 0.001 to about 1 gram per 10 minutes is formed in the low melt index (high molecular weight) reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst precursor formed in the first reactor in the series is transferred to the second reactor in the series;

(b) other than the active catalyst precursor referred to in proviso (a), no additional catalyst is introduced into the second reactor.

While the in situ blends prepared as above and the films produced therefrom are found to have the advantageous characteristics heretofore mentioned, the commercial application of these granular bimodal polymers for high clarity film applications is frequently limited by the level of gels obtained. Particle size distribution and flow characteristics studies indicate that the gas phase resins having an average particle size (APS) of about 400 to about 600 microns exhibit significant compositional, molecular, and rheological heterogeneities. When such a granular resin is compounded, for example, with a conventional twin screw mixer in a single pass, and the resulting pellets are fabricated into film, the film exhibits a high level of gels ranging in size from less than about 100 microns to greater than about 500 microns. These gels adversely effect the aesthetic appearance of the product. The gel characteristics of a film product are usually designated by a subjective scale of Film Appearance Rating (FAR) varying from minus 50 (very poor; these films have a large number of large gels) to plus 50/plus 60 (very good; these films have a small amount of, or essentially no, gels). The FAR of the single pass film product mentioned above is generally in the range of about minus 50 to about minus 10/0. For commercial acceptability, the FAR should be plus 20 or better.

Three suggestions have been made for improvement of the FAR, i.e., removal of the fraction containing the larger resin particles so as to remove the suspected source of the large gels; making the components of the resin particle more similar to facilitate their mixing within the resin particle; and the use of longer residence times in the extruder to achieve more efficient mixing of the resin particles. Unfortunately, removal of the larger resin particles was found to increase the size and number of gels in the film; the use of similar components improved the FAR, but did not provide the desired increase in the end-use properties of the resin; and the longer residence time in the extruder proved to be logistically unacceptable and prohibitively expensive.

DISCLOSURE OF THE INVENTION

An object of this invention, therefore, is to provide a process for preparing an in situ blend, which, can be extruded into a film having a commercially acceptable FAR as well as desirable end-use properties without the need for excessive extruder residence times. Other objects and advantages will become apparent hereinafter.

According to the present invention such a process has been discovered, said process being one for the production of an in situ particulate polyethylene blend, which in film form has a low gel count, comprising contacting a magnesium/titanium based catalyst system including a particulate precursor with one or more alpha-olefins in each of two or more reactors connected in series, in the gas phase, under polymerization conditions, with the provisos that:

(a) the particulate precursor has a particle size distribution span of no greater than about 1.5 as introduced into the first reactor in the series;

(b) ethylene is introduced into each reactor;

(c) optionally, an alpha-olefin having at least 3 carbon atoms is introduced into at least one reactor;

(d) the mixture of ethylene polymer matrix and active catalyst formed in the first reactor in the series is transferred to the subsequent reactors in the series; and (e) the polymerization conditions in each reactor are such that a high molecular weight polymer is formed in at least one reactor and a low molecular weight polymer is formed in at least one other reactor wherein the ratio of molecular weights of high molecular weight polymer to low molecular weight polymer in the final blend is at least about 8:1.

A preferred embodiment of the foregoing process comprises contacting a magnesium/titanium based catalyst system including a supported, spray dried, or precipitated particulate precursor with ethylene or a mixture of ethylene and one or more alpha-olefin comonomers having 3 to 12 carbon atoms in each of two reactors connected in series, in the gas phase, under polymerization conditions, with the provisos that:

(a) the particulate precursor has a particle size distribution span of no greater than about 1.2 as introduced into the first reactor in the series;

(b) the mixture of ethylene polymer matrix and active catalyst formed in the first reactor in the series is transferred to the second reactor in the series;

(c) no additional catalyst is introduced into the second reactor;

(d) in the reactor in which a high molecular weight polymer is made:
  (1) if the polymer is a copolymer, the alpha-olefin is present in a ratio of about 0.01 to about 0.4 mole of alpha-olefin per mole of ethylene;
  (2) optionally, hydrogen is present in a ratio of about 0.001 to about 0.3 mole of hydrogen per mole of ethylene; and (e) in the reactor in which a low molecular weight polymer is made:
  (1) if the polymer is a copolymer, the alpha-olefin is present in a ratio of about 0.005 to about 0.6 mole of alpha-olefin per mole of ethylene;
  (2) hydrogen is present in a ratio of about 0.5 to about 3 moles of hydrogen per mole of ethylene; and (f) the polymerization conditions in each reactor are such that a high molecular weight polymer is formed in at least one reactor and a low molecular weight polymer is formed in at least one other reactor wherein the ratio of molecular weights of high molecular weight polymer to low molecular weight polymer in the final blend is at least about 20:1.

DESCRIPTION OF THE PREFERRED EMBODIMENTS(s)

The particle size distribution span is determined according to the following formula:

Span=$(D_{90}-D_{10}) \div D_{50}$ wherein D is the median particle size as measured by diameter at the 90th, 10th, or 50th percentile of the distribution.

The span can be no greater about 1.5, and is preferably no greater than about 1.2. Most preferably, the span is no greater than about 1.0. It is an indicator of the width of the particle size distribution. While the lowest possible span can be zero if the size of all of the particles is the same; as a practical matter, the lowest span is generally no less than about 0.5.

The desired particle size distribution span is achieved by the above process, which takes advantage of the technique of catalyst precursor replication, i.e., the resin particle tends to have the shape and span of the precursor particle except on a larger physical scale. Typically, the resin particle is 10 to 30 times the size of the precursor particle. The replication is accomplished by starting with a particulate catalyst precursor having the desired particle size distribution span. Since a supported catalyst precursor generally takes on the particle size distribution span of its support, using a support of the desired particle size distribution span is the most effective way to achieve the desired span in the blend. The result can also be accomplished with a spray dried or precipitated catalyst precursor.

While the blend can be produced in two or more reactors connected in series, it is preferably produced in two reactors connected in series wherein a mixture of resin and solid catalyst precursor is transferred from the first reactor to the second reactor in which another polymer is prepared and blends in situ with the polymer from the first reactor. Where more than two reactors are used, it will be understood that the mixture of resin and active catalyst from the first reactor is transferred from reactor to reactor in the series together with the resin formed in each of the subsequent reactors. Thus, there is a continuous blending.

For the purposes of this specification, the term "reactor" can mean either an independent reactor or a stage within a reactor. Thus, the process can be carried out in two or more independent reactors; in two or more stages within one reactor; or in a combination of reactors and stages, all connected in series. It is preferred, however, to carry out the process of the invention in two independent reactors. Conventional prepolymerization can be effected in the first independent reactor or stage, if desired.

The polymer produced in any of the reactors can be a homopolymer of ethylene or a copolymer of ethylene and at least one alpha-olefin having at least 3 carbon atoms. Preferably, the copolymers of ethylene and at least one alpha-olefin comonomer have 3 to 12 carbon atoms. The alpha-olefins most preferably have 3 to 8 carbon atoms, and can be, for example, propylene, 1-butene, 1-hexene, 4-methyl-1-pentene, or looctene. Further, no more than one or two alpha-olefin comonomers per reactor, in addition to ethylene, is suggested. Typically, the blends produced are homopolymer/homopolymer blends, homopolymer/copolymer blends, and copolymer/copolymer blends.

Preferred comonomer combinations with respect to the copolymer/copolymer blends are as follows:

| high mol wt reactor | low mol wt reactor |
| --- | --- |
| 1-hexene | 1-hexene |
| 1-butene | 1-hexene |
| 1-butene | 1-butene |
| 1-hexene | 1-butene |

The 1-hexene/1-hexene combination is found to give the best film properties; however, the 1-hexene/1-butene combination is found to provide acceptable properties while still meeting the desired level of extractables. Homopolymer/copolymer blends are also advantageous for certain applications.

It will be understood that the in situ blend can be characterized as a bimodal resin. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

In this specification, the terms "high molecular weight" and "low molecular weight" refer to weight average molecular weight. The ratio of molecular weights of high molecular weight polymer to low molecular weight polymer in the final blend can be at least about 8:1, and is preferably at least about 20:1, regardless of the number of reactors used. The difference between the high molecular weight polymer and the low molecular weight polymer, in terms of molecular weight, is, generally, at least about 100,000.

The magnesium/titanium based catalyst system can be exemplified by the catalyst system described in U.S. Pat. No. 4,302,565. The solid particulate precursor can be supported or unsupported. Another catalyst system is one where the solid particulate precursor is formed by spray drying and used in slurry form. Such a catalyst precursor, for example, contains titanium, magnesium, aluminum halides, an electron donor, and an inert filler. The precursor is then introduced into a hydrocarbon medium such as mineral oil to provide the slurry form. This is described in U.S. Pat. No. 5,290,745.

It will be understood that the precursor is introduced into the first reactor where it comes into contact with the cocatalyst, and is changed from its original precursor form to an active catalyst. Thus, the active catalyst is transferred to subsequent reactors rather than the precursor.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. Thus, the term "catalyst precursor" is considered to include activated catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono-and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators or modifiers. About 10 to about 400 moles, and preferably about 10 to about 100 moles of cocatalyst, per mole of titanium compound can be used.

In those cases where it is desired to support the precursor, silica is the preferred support. As noted above, using a support such as silica having the required span will produce a resin having the required span by substantial replication. Other suitable supports are inorganic oxides such as aluminum phosphate, alumina, silica/alumina mixtures, and silica modified with reagents capable of reacting with surface silanols such aluminum compounds exemplified by alkylaluminums and aluminum halides, boron alkyls and halides, dialkyl zincs, and hexamethyldisilazane. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. A typical silica support having an average particle size of 75 microns and a particle size distribution span of 0.9 to 1.5 can, for example, be obtained by fractionating a silica support having an average particle size of 80 microns and a particle size distribution span of 1.9. Generally, the amount of support used is that which will provide about 0.1 to about 0.5 millimole of titanium per gram of support and preferably about 0.2 to about 0.3 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in slurry form.

As mentioned above, the catalyst precursor can be obtained by spray drying. In this option, a solution of the precursor is prepared and slurried with an inert filler. The slurry is then spray dried by methods such as disclosed in U.S. Pat. No. 5,290,745. Generally, the amount of inert filler used is that which will provide about 0.3 to about 2.5 millimole of titanium per gram of spray-dried precursor. The fillers which are added to the solution prior to spray drying include any organic or inorganic compounds, which are inert to the titanium compound and the final active catalyst, such as silicon dioxide in the form of fumed silica, titanium dioxide, polystyrene, rubber modified polystyrene, magnesium chloride, and calcium carbonate. The fillers can be used individually or in combination. The spray dried precursor is about 10 to about 95 percent by weight filler. Typical Mg/Ti atomic ratios in the spray dried precursor range from about 3:1 to about 10:1. Average particle size and particle size distribution span can be adjusted by process means during spray-drying, and can be, furthermore, altered by separation techniques after spray-drying. Typical average particle sizes range from about 10 to about 30 microns using standard shaping and sizing techniques. Moderate fractionation by size of a spray-dried composition with a span of 1.7 can lead to a particle size distribution span below about 1.5.

Where a modifier is used, the modifiers are usually dissolved in an organic solvent such as isopentane and, where a support is used, impregnated into the support following impregnation of the titanium compound or complex, after which the supported catalyst precursor is dried. Modifiers are similar in chemical structure and function to the activators. For variations, see, for example, U.S. Pat. No. 5,106,926. Neither modifiers nor activators have any meaningful effect on the average particle size or span of the precursor. The activator is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a solid particulate catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $M_gCl_2$, $M_gBr_2$, and $M_gI_2$. Anhydrous $M_gCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula BX3 or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1. Since the modifier reacts with the precursor, it becomes part of the precursor; however, it does not affect the average particle size of the precursor to any meaningful extent.

In a typical process, the entire catalyst system, which includes the solid precursor or activated precursor and the cocatalyst, is added to the first reactor. The catalyst is embedded in the copolymer produced in the first reactor, and the mixture is transferred to the second reactor. Insofar as the catalyst system is concerned, only cocatalyst is added to the second reactor from an outside source. Polymerization is conducted substantially in the absence of catalyst poisons such as moisture, oxygen, carbon monoxide, carbon dioxide, and acetylene.

A relatively low melt index (or high molecular weight) polymer can be prepared in the first reactor, and a relatively high melt index (or low molecular weight) polymer can be prepared in the second reactor. This can be referred to as the forward mode. Alternatively, the low molecular weight polymer can be prepared in the first reactor and the high molecular weight polymer can be prepared in the second reactor. This can be referred to as the reverse mode.

The mixture of polymer and an active catalyst is usually transferred from the first reactor to the second reactor via an interconnecting device using nitrogen or second reactor recycle gas as a transfer medium.

In the high molecular weight reactor:

Because of the low values, instead of melt index, flow index is determined and those values are used in this specification. The flow index can be in the range of about 0.01 to about 30 grams per 10 minutes, and is preferably in the range of about 0.2 to about 12 grams per 10 minutes. The molecular weight of this polymer is, generally, in the range of about 135,000 to about 445,000. The density of the polymer can be at least 0.860 gram per cubic centimeter, and is preferably in the range of 0.900 to 0.940 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) polymer is prepared in this reactor. The high melt index can be in the range of about 50 to about 3000 grams per 10 minutes, and is preferably in the range of about 50 to about 1000 grams per 10 minutes. The molecular weight of the high melt index polymer is, generally, in the range of about 15,800 to about 35,000. The density of the polymer prepared in this reactor can be at least 0.900 gram per cubic centimeter, and is preferably in the range of 0.910 to 0.975 gram per cubic centimeter. The melt flow ratio of this polymer can be in the range of about 20 to about 70, and is preferably about 20 to about 45.

The blend or final product, as removed from the second reactor, can have a melt index in the range of about 0.02 to about 3.5 grams per 10 minutes, and preferably has a melt index in the range of about 0.04 to about 2.0 grams per 10 minutes, or a flow index in the range of about 4 to about 165 grams per 10 minutes. The melt flow ratio is at least about 50, and is preferably in the range of about 55 to about 185. The molecular weight of the final product is, generally, in the range of about 90,000 to about 450,000. The density of the blend is at least 0.915 gram per cubic centimeter, and is preferably in the range of 0.916 to 0.960 gram per cubic centimeter.

In carrying out the process of the invention, it is preferred to essentially eliminate fines, which can be accomplished, for example, by sieving the blend in a conventional manner. Fines are generally considered to be particles having a particle size of less than about 200 microns.

As noted above, the blend has a broad molecular weight distribution which can be characterized as bimodal. The broad molecular weight distribution is reflected in an Mw/Mn ratio of about 8 to about 44, preferably about 20 to about 30. Mw is the weight average molecular weight; Mn is the number average molecular weight; and the Mw/Mn ratio can be referred to as the polydispersity index, which is a measure of the breadth of the molecular weight distribution.

The weight ratio of polymer prepared in the high molecular weight reactor to polymer prepared in the low molecular weight reactor can be in the range of about 0.4:1 to about 2:1, and is preferably in the range of about 0.75:1 to about 1.6:1. The optimum weight ratio is about 1:1. This is known as the split ratio or split.

In a typical process for the in situ blending of polymers, the magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index reactor:

Where it is desired to produce a copolymer, the mole ratio of alpha-olefin to ethylene can be in the range of about 0.01:1 to about 0.4:1, and is preferably in the range of about 0.02:1 to about 0.26:1. The mole ratio of hydrogen (if used) to ethylene can be in the range of about 0.001:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor:

Where it is desired to produce a copolymer, the mole ratio of alpha-olefin to ethylene can be in the range of about 0.005:1 to about 0.6:1, and is preferably in the range of about 0.01:1 to about 0.42:1. The mole ratio of hydrogen to ethylene can be in the range of about 0.5:1 to about 3:1, and is preferably in the range of about 1.7:1 to about 2.2:1. The operating temperature is generally in the range of about 70° C. to about 110° C. As mentioned above, the temperature is preferably varied with the desired density.

The pressure is generally the same in both the first and second reactors. The pressure, i.e., the total pressure in the reactor, can be in the range of about 200 to about 450 psi and is preferably in the range of about 280 to about 350 psig. The ethylene partial pressure in the first reactor and the ethylene partial pressure in the second reactor are set according to the amount of polymer it is desired to produce in each of these reactors, i.e., to achieve the split ratio mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen.

The polymerization is preferably carried out in the gas phase in two or more fluidized bed reactors connected in series, but can also be carried out in one or more stirred-tank reactors.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687, and a typical fluidized bed polymerization procedure is described in U.S. Pat. No. 4,302,565.

The gaseous feed streams of ethylene, other gaseous alphaolefins, and hydrogen, when used, are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in each fluidized bed can be in the range of about 1 to about 12 hours and is preferably in the range of about 2 to about 5 hours.

A description of a typical stirred-tank reactor and process therefor follows. The stirred-tank reactor is a two-phase (gas/solid) stirred bed, back mixed reactor. A set of four "plows" mounted horizontally on a central shaft rotate at 200 revolutions per minute (rpm) to keep the particles in the reactor mechanically fluidized. The cylinder swept by these plows measures 40.6 centimeters (16 inches) in length by 39.7 centimeters (15.6 inches) in diameter, resulting in a mechanically fluidizable volume of 46 liters ( 1.6 cubic feet). The gas volume, larger than the mechanically fluidizable volume due to the vertical cylindrical chamber, totals 54.6 liters (1.93 cubic feet). A disengager vessel is mounted atop the vertical cylinder on the reactor. This vessel has a gas volume of 68 liters (2.41 cubic feet), more than doubling the gas volume of the reactor. Gas is continually recirculated through both the reactor and disengager via a blower so that the gas composition is homogeneous throughout.

Reactor pressure Used is typically 300 to 450 psig. Monomers and hydrogen (for molecular weight control) are fed to the reactor continuously via control valves. Partial pressures of monomer range typically between 150 to 300 psi. Comonomer (if any) content in the polymer is controlled by adjusting feed rates to maintain a constant comonomer/monomer molar ratio in the gas phase. Gas composition is measured at 4 to 6 minute intervals by a gas chromatograph analyzer. Molecular weight of the polymer is controlled by adjusting hydrogen feed rate to maintain a constant mole ratio of hydrogen to monomer in the gas phase. Nitrogen makes up the balance of the composition of the gas, entering with the catalyst and leaving via a small vent of the reactor gases. Vent opening is adjusted via computer to maintain constant total pressure in the reactor The reactor is cooled by an external jacket of chilled glycol. The bed temperature is measured with an RTD temperature probe in a thermowell protruding into the bed at a 60° angle below horizontal, between the inner set of plows. Reactor temperature can be controlled to values in the range of 10° to 110° C. Catalyst precursor can be fed either dry or as a slurry. Dry catalyst precursor is metered in shots into a 0.5 to 1 pound per hour nitrogen stream and is fed to the reactor via a ⅛ inch tube. Slurry catalyst precursor is metered in shots into a continuous stream of either isopentane or cocatalyst/isopentane solution in a ⅛ inch tube and this mixture is co-fed to the reactor with a 0.5 to 1 pound per hour nitrogen stream, which keeps polymer from forming in the injection tube. In either case, the catalyst is injected into the bed at an angle of approximately 45° below vertical into the central zone between the front and rear plows.

Typical batch yields of granular polymer are 20 to 25 pounds with 30 to 35 pounds being the upper limit. Batch runs typically last 3 to 6 hours. Alternatively, the reactor can be run in the continuous mode in which granular polymer is withdrawn in typically 0.4 pound shots while the polymerization is in progress. In the continuous mode, the product discharge system is enabled after the bed weight builds to typically 15 to 25 pounds, and the rate of discharge is altered to maintain constant bed weight.

A typical run commences with monomers being charged to the reactor and feeds adjusted until the desired gas composition is reached. An initial charge of cocatalyst is added prior to starting catalyst precursor feeding in order to scavenge any poisons present in the reactor. After catalyst precursor feed starts, monomers are added to the reactor sufficient to maintain gas concentrations and ratios. As the catalyst inventory builds up, polymer production rate increases to 5 to 10 pounds per hour at which point catalyst precursor feed is adjusted to maintain a constant polymer production rate. Cocatalyst feed rate is maintained in proportion to the catalyst precursor feed rate. A start-up bed may be used to facilitate stirring and dispersal of catalyst during the initial part of the operation. After the desired batch weight is made, the reactor is quickly vented, and monomers are purged from the resin with nitrogen. The batch is then discharged into a box, open to the atmosphere, unless other catalyst deactivation measures are specified. For multicomponent operation, e.g., in situ blending, the desired fraction of resin is prepared under the initial reaction conditions, the conditions are changed to the conditions appropriate for the following stage of polymerization, and reaction is continued.

The resin blend obtained by any of the above processes can be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

Various features mentioned above can also be found in U.S. Pat. Nos. 4,684,703; 4,293,673; and 4,354,009.

The advantages of the invention are found in the film prepared from the resin blend in that FAR values of plus 20 or higher are consistently achieved. Also, the resin blend contains a low level of fines as well as desirable end-use properties without the need for excessive extruder residence times.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and antiblocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents mentioned in this specification are incorporated by reference herein.

The invention is illustrated by the following examples.

EXAMPLE 1 and 2

The impregnated catalyst precursor is prepared as follows: A magnesium chloride/titanium chloride/tetrahydrofuran (THF) mixture is impregnated into a silica support from a solution of THF. The silica is first dried at 600° C. to remove water and most of the surface silanols, and chemically treated with triethylaluminum (TEAL) to further passivate the remaining silanols. In example 1, the treated support has an average particle size of 80 microns, and a span of 1.2. In example 2, the treated support has an average particle size of 40 microns, and a span of 1.8. The dried free flowing impregnated precursor is then used in the polymerization.

The polymerization for each example is carried out in stages in the stirred-tank reactor described above. The bed of the reactor is treated with 225 cubic centimeters of a 5 percent by weight solution of TEAL in isopentane. Polymerization is initiated by feeding an 8 gram batch charge of the above supported catalyst precursor and continuously feeding a cocatalyst into the reactor together with ethylene, 1-hexene, and hydrogen. Aim atomic ratios are 20:1 to 80:1 Al/Ti in the bed. When the desired amount of first stage resin has been produced, reaction conditions are changed to produce the second stage component. The reaction temperature, and ratios of ethylene, 1-hexene, and hydrogen are adjusted to give the final product having the desired ratio of components, and the desired composition of the second stage component. Additional cocatalyst is also introduced in the second stage of polymerization if the reaction rate begins to drop off. The in situ blend of copolymers is produced in granular form.

The reaction conditions in each of the two stages are as set forth in Table I:

TABLE I

| | first stage | second stage |
|---|---|---|
| total pressure(psig) | 300 | 350 |
| temperature(°C.) | 80 | 110 |
| H2/C2(molar ratio) | 0.007 | 1.81 |
| C6/C2(molar ratio) | 0.04 | 0.02 |
| C2 partial pressure(psi) | 60 | 95 |

The resin properties are set forth in Table II. These are the resin properties of the polyethylene produced in the first stage, and the properties of the final blend.

TABLE II

| | 1 | | 2 | |
|---|---|---|---|---|
| Example | 1st stage | final blend | 1st stage | final blend |
| flow index (g/10 min) | 0.6 | 7.7 | 0.61 | 7.5 |
| melt flow ratio | — | 123 | — | 118 |
| density (g/cc) | 0.939 | 0.949 | 0.939 | 0.949 |
| bulk density (lbs/cu ft) | — | 22.2 | 19.6 | 24.5 |
| APS (inch) | — | 0.032 | — | 0.019 |
| split (% by wt) | 57 | 43 | 57 | 43 |

The resins from the above examples are extruded into 35 micron thick films in a 20 millimeter Brabender™ extruder fitted with a 150 millimeter ribbon die at a temperature of 200° C. 100 successive gels in each film are identified, and the size and distribution of the gels are determined via video microscopy. The frequency of gels of a given size (either by the diameter or area of the gel) is plotted against the size of the gel. The number of large (greater than 75 microns) gels and the number of small (less than 75 microns) gels are counted over a film area of 150 square centimeters. Two replicate measurements are made and averaged.

Characteristics of the above resins, i.e., the in situ blend, and the films are set forth in Table III:

TABLE III

| Example | 1 | 2 |
|---|---|---|
| flow index(g/10 min) | 8.6 | 7.7 |
| melt flow ratio | 118 | 127 |
| flow index variation | 7.7 to 10.5 | 4.3 to 66.7 |
| APS(microns) | 980 | 465 |
| percent fines(less than 200 microns) | 1.8 | 19 |
| gel count (per 150 cm²) | 22 | 68 |
| HMW/LMW | 21.2 | 20 |
| span | 1.4 | 1.9 |

Tables I to III demonstrate that the resin from example I having a larger average particle size, and a narrower particle size distribution, is a resin of more uniform flow index with fewer large gels than are obtained in example 2, which employs a catalyst having a broader particle size distribution.

EXAMPLE 3 to 5

A spray-dried catalyst precursor is prepared as follows: A solution of magnesium chloride and titanium trichloride (5:1 Mg/Ti atomic ratio) in tetrahydrofuran (THF) is spray-dried from a slurry of THF containing non-porous, hydrophobic colloidal silica of negligible pore volume. The dilution is 7 weight percent solids, with about 50:50 weight ratio of metal salts to filler. The resulting spray-dried precursor is separated by sieving. The particle size distribution and particle size distribution span of the catalyst precursor is set forth in Table IV together with resin properties of the final blend. The polymers are produced in a stirred gas phase reactor under substantially the same conditions as described in Table I.

TABLE IV

| Example | 3 | 4 | 5 |
|---|---|---|---|
| Catalyst precursor sieve fraction | (unsieved) | (on screen) | (through screen) |
| APS of catalyst precursor (microns) | 20 | 30 | 10 |
| Span of catalyst precursor | 1.73 | 1.4 | 1.5 |
| Flow index (g/10 min) | 11 | 7 | 14 |
| density (g/cc) | 0.949 | 0.949 | 0.949 |
| HMW/LMW | 18 | 20 | 16 |
| Gel count (gels/150 cm²) | 145 | 34 | 90 |

As shown in the above Table IV, the resin from the catalyst precursors with narrower particle size distribution spans have the lowest number of gels (Examples 4 and 5 vs. Example 3); for about equal catalyst precursor particle size distribution spans (Example 4 vs. Example 5), the catalyst precursor with the larger particle size gave fewer gels.

EXAMPLE 6 to 8

Polymerizations are conducted in a two-stage fluidized bed reactor using Mg/Ti precursors impregnated into silica supports having the average particle sizes and spans shown below. The silicas are first dehydrated at 600° C., and passivated with 5 weight percent TEAL. The titanium loading employed is 0.22 to 0.25 millimole Ti per gram precursor; Mg/Ti atomic ratios are 0.75:1.

Polymerization is initiated in the first stage by continuously feeding the above impregnated precursor and a cocatalyst (5 percent by weight TEAL in isopentane) into a fluidized bed of polyethylene granules together with the gaseous comonomers and hydrogen. The resulting particles composed of nascent copolymer and dispersed active catalyst are withdrawn from the first stage and transferred to the second stage using either nitrogen or the gas composition of the second stage as a transfer medium. The second stage, on start-up, also contains a fluidized bed of polymer particles. Again, gaseous comonomer and hydrogen are introduced into the second stage where they come into contact with the particles coming from the first stage. Additional cocatalyst is also introduced. The polymer particles containing a mixture of first and second stage components are continuously removed. Variables with respect to catalyst precursor and conditions as well as the properties of the resin product are set forth in Table V. 1-Hexene is employed as comonomer.

Films are prepared, and optical properties determined as described above.

TABLE V

| Example | 6 | | 7 | | 8 | |
|---|---|---|---|---|---|---|
| catalyst precursor: | | | | | | |
| support (APS) | 35 | | 75 | | 75 | |
| support (span) | 1.9 | | 1.5 | | 0.91 | |
| Reactor | 1 | 2 | 1 | 2 | 1 | 2 |
| Reaction conditions: | | | | | | |
| temperature (°C.) | 85 | 110 | 85 | 110 | 85 | 110 |
| pressure(psi) | 256 | 400 | 300 | 395 | 400 | 400 |
| H2/C2 mole ratio | 0.022 | 1.8 | 0.026 | 1.8 | 0.023 | 1.8 |
| C6/C2 mole ratio | 0.034 | 0.015 | 0.033 | 0.015 | 0.039 | 0.01 |
| C2 partial pressure | 44 | 100 | 37 | 77 | 45 | 100 |
| split (% by wt) | 60 | 40 | 60 | 40 | 60 | 40 |
| Resin properties | final blend | | final blend | | final blend | |
| flow index (g/10 min) | 0.40 | 6.3 | 0.43 | 6.9 | 0.47 | 7.3 |
| density (g/cc) | 0.930 | 0.949 | 0.931 | 0.947 | 0.931 | 0.947 |
| residual Ti(ppm) | 7.0 | 3.85 | 10 | 5.8 | 4.8 | 3.4 |
| HMW/LMW | | 21 | | 20 | | 20 |
| APS(inch) | 0.027 | 0.027 | 0.032 | 0.033 | 0.05 | 0.043 |
| FAR | | plus 20/30 | | plus 30 | | plus 40/50 |
| gels per 150 cm² | | 94 | | 50 | | 14 |

As can be seen from Table V, the film from example 8 using a catalyst precursor with a larger average particle size (APS) and a very narrow particle size distribution span is considerably superior to the film with the smaller catalyst precursor APS and the intermediate particle size distribution span (Example 6), and is superior to the film using a catalyst precursor with a larger APS and a moderately narrow particle size distribution span (Example 7).

Notes to Tables:
1. Melt Index (g/10 min) is determined under ASTM D-238, Condition E. It is measured at 190° C. and reported as grams per 10 minutes.
2. Flow Index is determined under ASTM D-1238, Condition F. It is measured at 10 times the weight used in the melt index test above. Flow index variation: flow index of sieved fractions from the largest (greater than 10 mesh) to the smallest (less than 140 mesh).
3. Melt Flow Ratio is the ratio of flow index to melt index.
4. Density (g/cc) is the density of the ethylene/1-hexene copolymer product in gram per cubic centimeter.
5. The bulk density of each of the resins (not the blend) is given in pounds per cubic foot.
6. Split (% by wt): This is the percent by weight of each polyethylene in the blend based on the weight of the blend.
7. The catalyst precursor particle size and the polymer particle size are obtained from a Malvern™ 2600 particle size analyzer. Polymer particle size analyses are also obtained from a Rotap™ sieving device.
8. Gel count is the average of two counts, and includes both large and small gels affecting FAR values. The count is the number of gels per 150 square centimeters of film.
9. APS=average particle size.
10. HMW=high molecular weight
11. LMW=low molecular weight
12. FAR is the film appearance rating, a rating derived by visual inspection of the film, discussed above.

We claim:

1. A process for the production of an in situ particulate polyethylene blend comprising contacting a magnesium/titanium based catalyst system including a particulate precursor with one or more alpha-olefins in each of two or more reactors connected in series, in the gas phase, under polymerization conditions, with the provisos that:
    (a) the particulate precursor has a particle size distribution span of no greater than 1.5 as introduced into the first reactor in the series;
    (b) ethylene is introduced into each reactor;
    (c) optionally, an alpha-olefin having at least 3 carbon atoms is introduced into at least one reactor;
    (d) the mixture of ethylene polymer matrix and active catalyst formed in the first reactor in the series is transferred to the subsequent reactors in the series; and
    (e) the polymerization conditions in each reactor are such that a high molecular weight polymer is formed in at least one reactor and a low molecular weight polymer is formed in at least one other reactor wherein the ratio of molecular weights of high molecular weight polymer to low molecular weight polymer in the final product is at least about 8:1.

2. The process defined in claim 1 wherein the catalyst system includes a particulate catalyst precursor having a particle size distribution span of no greater than about 1.2.

3. The process defined in claim 1 wherein the particulate catalyst precursor is supported, spray dried, or precipitated.

4. The process defined in claim 1 wherein the process is carried out in fluidized bed reactors.

5. A process for the preparation of an in situ particulate polyethylene blend comprising contacting a magnesium/titanium based catalyst system including a supported, spray dried, or precipitated particulate precursor with ethylene or a mixture of ethylene and one or more alpha-olefin comonomers having 3 to 12 carbon atoms in each of two reactors connected in series, in the gas phase, under polymerization conditions, with the provisos that:
    (a) the particulate precursor has a particle size distribution span of no greater than about 1.2 as introduced into the first reactor in the series;
    (b) the mixture of ethylene polymer matrix and active catalyst formed in the first reactor in the series is transferred to the second reactor in the series;
    (c) no additional catalyst is introduced into the second reactor;
    (d) in the reactor in which a high molecular weight polymer is made:
        (1) if the polymer is a copolymer, the alpha-olefin is present in a ratio of about 0.01 to about 0.4 mole of alpha-olefin per mole of ethylene;
        (2) optionally, hydrogen is present in a ratio of about 0.001 to about 0.3 mole of hydrogen per mole of ethylene; and
    (e) in the reactor in which a low molecular weight polymer is made:
        (1) if the polymer is a copolymer, the alpha-olefin is present in a ratio of about 0.005 to about 0.6 mole of alpha-olefin per mole of ethylene;

(2) hydrogen is present in a ratio of about 0.5 to about 3 moles of hydrogen per mole of ethylene; and (f) the polymerization conditions in each reactor are such that a high molecular weight polymer is formed in at least one reactor and a low molecular weight polymer is formed in at least one other reactor wherein the ratio of molecular weights of high molecular weight polymer to low molecular weight polymer in the final blend is at least about 8:1.

6. The process defined in claim 5 wherein the blend is produced under the following conditions:

in the reactor in which the high molecular weight polymer is made:
(1) an alpha-olefin having 3 to 8 carbon atoms is present in a ratio of about 0.02 to about 0.26 mole of alpha-olefin per mole of ethylene; and
(2) hydrogen is present in a ratio of about 0.017 to about 0.18 mole of hydrogen per mole of ethylene; and in the reactor in which the low molecular weight polymer is made:
(1) an alpha-olefin having 3 to 8 carbon atoms is present in a ratio of about 0.01 to about 0.42 mole of alpha-olefin per mole of ethylene; and
(2) hydrogen is present in a ratio of about 1.7 to about 2.2 moles of hydrogen per mole of ethylene; and wherein the ratio of molecular weights of high molecular weight polymer to low molecular weight polymer in the final blend is at least about 20:1.

7. The process defined in claim 1 wherein the high molecular weight polymer has a flow index in the range of about 0.01 to about 30 grams per 10 minutes and a density in the range of about 0.860 to about 0.940 gram per cubic centimeter and the low molecular weigh polymer has a melt index in the range of about 50 to about 3000 grams per 10 minutes and a density in the range of about 0.900 to about 0.970 gram per cubic centimeter, the weight ratio of the high molecular weight polymer to the low molecular weight polymer being in the range of about 0.4:1 to about 2:1.

8. The process defined in claim 5 wherein the high molecular weight polymer has a flow index in the range of about 0.25 to about 12 grams per 10 minutes and a density in the range of 0.900 to 0.935 gram per cubic centimeter and the low molecular weight polymer has a melt index in the range of about 50 to about 1500 grams per 10 minutes and a density in the range of 0.905 to about 0.955 gram per cubic centimeter, the weight ratio of the high molecular weight polymer to the low molecular weight polymer being in the range of about 0.75:1 to about 1.6:1.

9. The process defined in claim 8 wherein the blend has a flow index in the range of about 4 to about 165 grams per 10 minutes; a melt flow ratio in the range of about 55 to about 185; and a density in the range of 0.910 to 0.930 gram per cubic centimeter.

* * * * *